US007269357B2

(12) United States Patent
Case et al.

(10) Patent No.: US 7,269,357 B2
(45) Date of Patent: Sep. 11, 2007

(54) TRANSCEIVER WITH PROGRAMMABLE SIGNAL PARAMETERS

(75) Inventors: Dan Case, Gilroy, CA (US); Andreas Weber, Los Altos, CA (US); Giorgio Giaretta, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 683 days.

(21) Appl. No.: 10/629,658

(22) Filed: Jul. 29, 2003

(65) Prior Publication Data

US 2004/0022544 A1 Feb. 5, 2004

Related U.S. Application Data

(63) Continuation-in-part of application No. 10/282,579, filed on Oct. 29, 2002.

(60) Provisional application No. 60/400,548, filed on Aug. 2, 2002.

(51) Int. Cl.
*H04B 10/00* (2006.01)
(52) U.S. Cl. .................. 398/135; 398/130; 398/138
(58) Field of Classification Search ............... 398/135, 398/138, 130, 128, 136, 137
See application file for complete search history.

(56) References Cited

U.S. PATENT DOCUMENTS

| | | | |
|---|---|---|---|
| 4,916,705 A | 4/1990 | Glance | |
| 5,019,769 A | 5/1991 | Levinson | |
| 5,383,208 A | 1/1995 | Queniat et al. | |
| 5,442,321 A | 8/1995 | Bayruns et al. | |
| 5,479,288 A | 12/1995 | Ishizuka et al. | |
| 5,502,785 A | 3/1996 | Wang et al. | |
| 5,537,093 A | 7/1996 | Aunon et al. | |
| 5,734,300 A | 3/1998 | Yoder | |
| 5,861,908 A | 1/1999 | Tonosaki et al. | |
| 5,878,015 A | 3/1999 | Schell et al. | |
| 5,933,264 A | 8/1999 | Van Der Heijden | |
| 5,956,168 A | 9/1999 | Levinson et al. | |
| 6,020,593 A | 2/2000 | Chow et al. | |
| 6,130,562 A | 10/2000 | Bosch et al. | |
| 6,333,804 B1 | 12/2001 | Nishiyama et al. | |
| 6,400,857 B1 | 6/2002 | Hatami-Hanza et al. | |
| 6,414,974 B1 | 7/2002 | Russell et al. | |
| 6,862,302 B2 * | 3/2005 | Chieng et al. | ........... 372/29.02 |
| 2002/0071164 A1 | 6/2002 | Lauge et al. | |
| 2002/0149821 A1 * | 10/2002 | Aronson et al. | ............ 359/152 |

* cited by examiner

*Primary Examiner*—M. R. Sedighian
(74) *Attorney, Agent, or Firm*—Workman Nydegger

(57) ABSTRACT

An integrated post-amplifier and laser driver assembly is provided that includes a digital control interface for communication with an external digital IC controller having an I2C bus configured to receive signal parameter programming input from a user. The PA/LD includes one or more DACs which communicate with the digital control interface by way of a glue logic module. A memory is provided in the PA/LD that communicates with the DACs by way of the glue logic module and stores an algorithm for facilitating implementation of changes to signal parameters of one or more signals by way of the DACs. Signal parameter programming instructions are received at the PA/LD from a user by way of the I2C bus, and/or from the internally coded algorithm, and are used by the DACs to facilitate implementation of changes to signal parameters of one or more signals.

43 Claims, 6 Drawing Sheets

TRANSCEIVER WITH PROGRAMMABLE SIGNAL PARAMETERS

RELATED APPLICATIONS

This application is a continuation-in-part of U.S. patent application Ser. No. 10/282,579, filed Oct. 29, 2002, which is incorporated herein by reference. This application also claims the benefit of U.S. Provisional Patent Application Serial No. 60/400,548, filed Aug. 2, 2002, which is incorporated herein by reference.

BACKGROUND OF THE INVENTION

1. Field of the Invention

The present invention relates generally to high speed data transmission systems. More particularly, embodiments of the present invention relate to systems and devices configured to enable modification of various signal parameters in order to accommodate particular system protocols, line rates, operating requirements, operating conditions, and other considerations that relate to the operation and performance of the system or device.

2. Related Technology

Many high speed data transmission networks rely on optical transceivers and similar devices for facilitating transmission and reception of digital data embodied in the form of optical signals. Typically, data transmission in such networks is implemented by way of an optical transmitter, such as a laser, while data reception is generally implemented by way of an optical receiver, an example of which is a photodiode.

Various other components are also employed by the optical transceiver to aid in the control of the optical transmit and receive components, as well as the processing of various data and other signals. For example, such optical transceivers typically include a driver configured to control the operation of the optical transmitter in response to various control inputs. The optical transceiver also generally includes a post-amplifier configured to perform various operations with respect to certain parameters of a data signal received by the optical transceiver.

In conventional optical transceivers, the driver and post-amplifier implement control and feedback functionalities, with respect to the post-amplifier and driver, through the use of various types of signals. By way of example, in the event that an optical data signal is lost, the post-amplifier may generate and transmit a corresponding loss-of-signal ("LOS") indicator. Typically, the assertion, and de-assertion, of signals such as LOS is performed when the post-amplifier or other component determines that certain predetermined criteria have been met. An example of one such criterion is a signal power threshold. When the post-amplifier detects, for example, that the optical signal power has dropped below a certain value, the LOS signal is asserted.

Generally, such criteria comprise fixed values that are defined with reference to particular system protocols, line rates, operating requirements and/or operating conditions. For example, the power threshold at which the LOS signal is asserted will differ depending upon the line rate of the system where the transceiver is employed. Thus, the power threshold for assertion of the LOS signal in a synchronous optical network ("SONET") OC-12 system will be lower than the power threshold for assertion of the LOS signal in a SONET OC-48 system.

As the foregoing suggests, typical optical transceivers and similar equipment and devices are quite constrained in terms of the types of systems with which they may be employed. This is largely due to the fact that the various criteria that govern the assertion and de-assertion of various control and feedback signals by the post-amplifier and/or driver have values that are preset at the time of production and cannot be subsequently changed or adjusted. Such a lack of flexibility is problematic.

For example, a device having various thresholds and other values set for compatibility with a SONET OC-48 system cannot readily be employed in connection with another system, such as a SONET OC-12 system, having a different line rate. Accordingly, a customer wishing to upgrade to a higher line rate could not use the lowspeed transceiver and would thus be compelled to purchase and install a new optical transceiver compatible with the higher line rate.

One particular illustration of the aforementioned problem concerns assert and deassert thresholds for an LOS, though the following concerns are generally germane to assert and deassert thresholds for other signals as well. In an effort to enhance flexibility, some devices have been configured with a wide predefined trip band for assertion of LOS. While such configurations are nominally compatible with multiple protocols and line rates, such as would necessitate a variety of different trip levels for LOS assertion and deassertion, those configurations necessitate definition of a trip band, as opposed to a single trip level. Definition and implementation of a trip band is necessary however in order to accommodate a potentially wide range of trip levels implicated by use of the device with multiple protocols and/or line rates. The trip band is also required because such devices cannot be reprogrammed, thus, the default course is to define a wide trip band in the first instance in order to provide some level of assurance that the device can be employed, even if relatively ineffectively, with multiple protocols.

As suggested by the foregoing, the definition and use of trip bands is problematic because assertion of LOS will be tripped by a relatively wider range of values than would typically be associated with any single protocol or line rate. Consequently, a decrease in responsivity of the device would be implicated since LOS would be asserted over an unduly wide range of conditions.

The lack of flexibility associated with known devices is demonstrated in other ways as well. For example, it is sometimes desirable to be able to modify the rise time of an optical signal in order to compensate for a change in temperature. However, a device having a preset optical signal rise time cannot accommodate such temperature changes. Such a lack of operational flexibility in the device may thus act to impair the overall operational effectiveness of the system.

The foregoing concerns exemplify the more general, and significant, problem with typical transceivers suggested earlier herein, that is, the inability of such transceivers to effectively accommodate a variety of different system operating requirements, and to accommodate often dynamic operating conditions and operating environments.

In view of the foregoing, it would be useful to provide a transceiver flexibly configured so that a single device can operate effectively in connection with a wide range of operational parameters, system protocols, and operating conditions. For example, the transceiver should be configured to enable user adjustments to various operational and performance parameters. In addition, the device should be capable of automatically adjusting aspects of its operation as necessitated by changes in operational parameters, protocols, and operating conditions.

BRIEF SUMMARY OF AN EXEMPLARY EMBODIMENT OF THE INVENTION

In general, embodiments of the invention are concerned with programmable systems and devices configured to enable programming and reprogramming of various signal parameters in order to accommodate particular system protocols, line rates, operating requirements, operating conditions and other considerations.

In one exemplary embodiment of the invention, an integrated post-amplifier and laser driver assembly ("PA/LD") suitable for use in a high speed communications system is provided that is configured to interface with an optical receiver and optical transmitter. The PA/LD is configured as a single IC and includes a digital control interface for communication with an external digital IC controller having an I2C bus configured to receive signal parameter programming input from a user. The PA/LD further includes one or more DACs which communicate with the digital control interface by way of a glue logic module. A memory is provided in the PA/LD that communicates with the DACs by way of the glue logic module and stores an algorithm for facilitating implementation of changes to signal parameters of one or more signals by way of the DACs.

In operation, signal parameter programming instructions are received at the PA/LD from a user by way of the I2C bus, and/or from the internally coded algorithm. The signal parameter programming instructions are then used by the DACs to facilitate implementation of changes to signal parameters of one or more signals. In one exemplary case, the PA/LD includes, among other things, an LOS circuit configured to receive a voltage $V_{IN}$ from an input optical signal strength detector. The LOS circuit also receives a reference voltage $V_{REF}$ whose value is programmed by way of a corresponding DAC. When $V_{IN}$ falls outside a predetermined range of deviation from $V_{REF}$, the LOS circuit asserts an LOS signal. The LOS circuit operates in similar fashion with respect to deassertion of the LOS signal.

These and other, aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF SELECTED EMBODIMENTS OF THE INVENTION

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

A. Aspects of Exemplary PA/LD Implementations

It should be noted that while some embodiments of the invention are well-suited for use in conjunction with a high speed data transmission system conforming to the Gigabit Ethernet ("GigE") physical specification, such operating environment is exemplary only and embodiments of the invention may, more generally, be employed in any of a variety of high speed data transmission systems, some of which may have line rates up to, or exceeding, 2.5 Gbit. For example, some embodiments of the invention are compatible with the Fibre Channel ("FC") physical specification.

Further, embodiments of the invention may be implemented in various ways. By way of example, some embodiments of the PA/LD are implemented in Small Form Factor Pluggable ("SFP") bi-directional transceiver modules. As suggested above, such transceiver modules are configured for GigE and/or FC compliance. Exemplarily, such transceiver modules are capable of transmitting and/or receiving at a wavelength of about 850 nm. Moreover, these transceiver modules can operate over a wide range of temperatures. For example, some of such transceiver modules are effective over a temperature range of about 80° C., such as from about −10° C. to about +70° C. Of course, such embodiments and associated operating parameters are exemplary only, and are not intended to limit the scope of the invention in any way.

B. Aspects of Exemplary PA/LD Architecture

Figure 1:
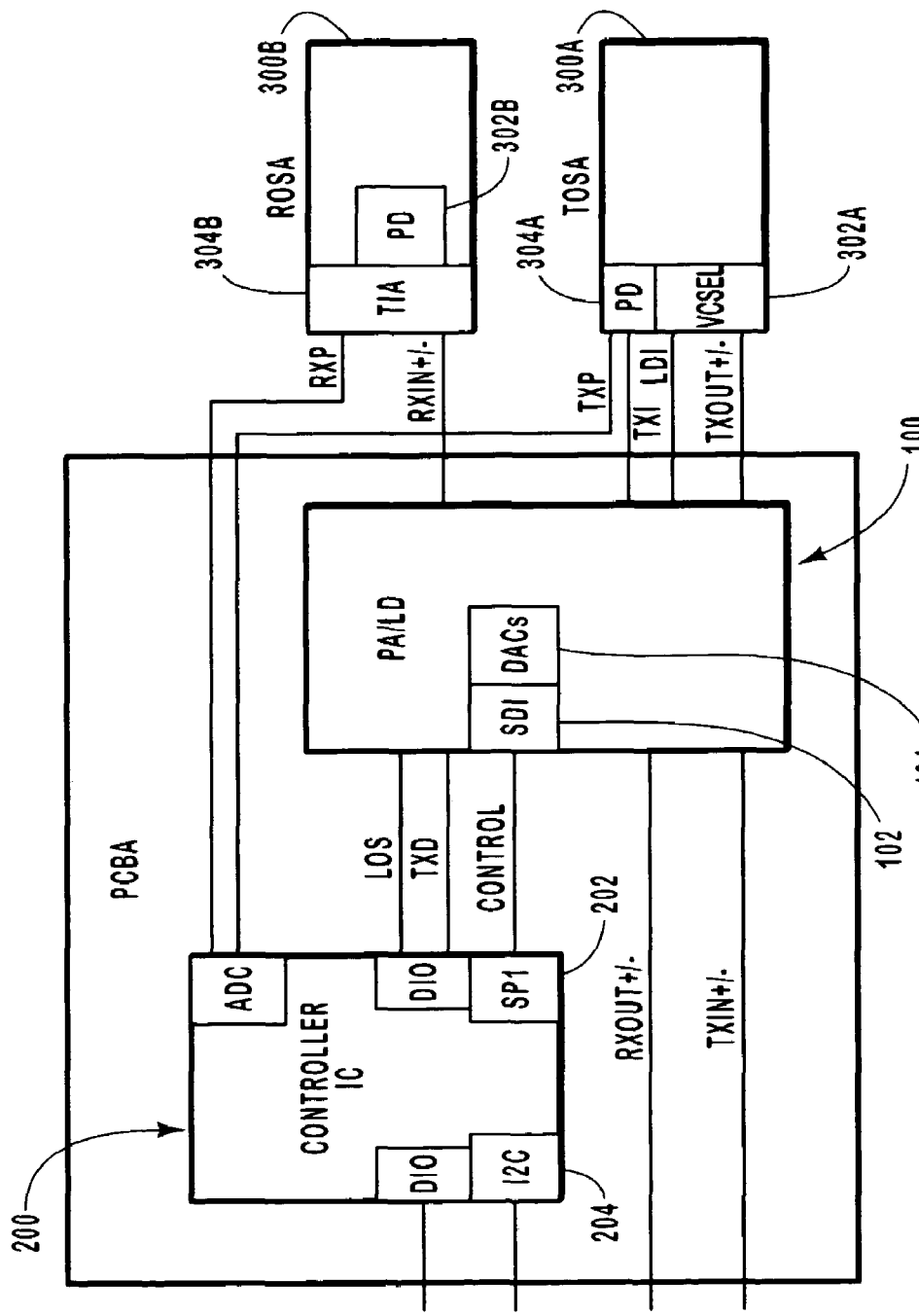
FIG. 1 is a block diagram that illustrates various aspects of an exemplary operating environment for embodiments of the present invention.

With reference first to FIG. 1, details are provided concerning various aspects of the general architecture of an exemplary embodiment of an integrated post-amplifier and laser driver ("PA/LD") assembly 100. Generally, the PA/LD 100 is configured for communication with a digital IC controller 200, as well as with a 'transmit' optical subassembly ("TOSA") 300A and a 'receive' optical subassembly ("ROSA") 300B.

Among other things, the PA/LD 100 comprises a digital control interface 102, exemplarily embodied as a serial digital interface, connected with glue logic module 103 that, in turn, is configured for communication with one or more digital-to-analog converters ("DAC") 104*n*. As indicated below in connection with the discussion of programmable transceivers and related devices, such DACs comprise an exemplary implementation of a means for setting a signal parameter in response to signal parameter programming instructions, wherein such instructions may, for example, be received directly from a user by way of a suitable bus, or may be generated by an internally coded algorithm. The scope of the invention is not limited to DACs however. Rather, any other system, component or device of comparable functionality may likewise be employed. For example, at least some signal parameters may be alternatively be set through the use of field programmable gate arrays ("FPGA"s), or similar devices.

One useful aspect of the aforementioned digital control interface is that it enables the use of multiple control parameters that can be readily multiplexed into one, or a relatively small number of, digital control signals. Thus, the digital control interface permits a relative increase in the number of PA/LD 100 operations that can be controlled, without necessitating a corresponding increase in components or circuitry and, by virtue of the use of digital control signals, the digital control interface also contributes to a relative decrease in the number of the control signals that are required to control PA/LD 100 operations. With respect to the foregoing, an internal serial bus arrangement may alternatively be employed to implement some or all of the functionality disclosed herein.

It should be noted here that the PA/LD 100 may be referred to herein as comprising a 'post-amplifier' or 'post-amplifier assembly,' and a 'laser driver' or 'laser driver assembly,' exemplary embodiments of which may comprise one or more amplifiers or other control devices intended to implement certain effects with respect to signals transmitted and/or received by the PA/LD 100. In yet other instances, no distinction between the post-amplifier and laser driver is made, and the PA/LD 100 may simply be referred to as comprising various control, and other, devices intended to implement certain effects with respect to signals transmitted and/or received by the PA/LD 100.

In general however, the devices and/or systems that are concerned with implementation of functionality that relates primarily to a data signal received by the PA/LD 100 are typically referred to as a 'post amplifier' or 'post amplifier assembly.' On the other hand, devices and/or systems that are concerned with implementation of functionality that relates primarily to control, by the PA/LD 100, of the transmission of a data signal are typically referred to as a 'laser driver or 'laser driver assembly.' Nonetheless, a device or system that comprises a portion of the 'post amplifier' in one embodiment, may comprise a portion of the 'laser driver' in another embodiment. Accordingly, the foregoing distinctions are not intended to, nor should be construed to, limit the scope of the invention in any way.

In general, the functionality of the integrated post-amplifier and laser driver assembly 100 is typically implemented as a single IC on a single-sided PCB. In some instances, the PA/LD is implemented as a non-hermetic plastic packaged IC with lead frame. However, other types of IC packages, such as ceramic packages, may alternatively be employed, consistent with the requirements of a particular application or operating environment.

One useful aspect of the single IC configuration is that it minimizes the number of external devices that are required, as some or all of the external devices can be incorporated within the IC. By way of example, at least some embodiments of the invention obviate the need for external passive devices that perform functions such as, but not limited to, set point, matching, filter, and A/C coupling. A related aspect of the single IC configuration is that it generally eliminates the need for connectors, such as flex connectors, between the post-amplifier and laser driver. Further, the single IC package can be incorporated into a relatively small size, as small as 4 mm×4 mm in some cases.

In the illustrated embodiment, the TOSA 300A exemplarily comprises a vertical cavity surface emitting laser ("VCSEL") 302A in communication with a photodiode 304A. In at least some embodiments, the VCSEL comprises a non-hermetic lead frame plastic package. One aspect of VCSELs that makes them desirable in at least some applications is their relatively low cost. Of course, other types of optical transmitters may also be employed. In general, any light transmission source, and transmission wavelength, that is compatible with PA/LD 100 may be used.

Similarly, ROSA 300B exemplarily comprises a PIN photodiode 302B in communication with a transimpedance amplifier ("TIA") 304B and, in this embodiment at least, requires no capacitors for its operation. Moreover, in at least some embodiments, the ROSA is implemented as a non-hermetic lead frame plastic package. As in the case of the TOSA 300A however, other embodiments of ROSA 300B may alternatively be employed.

In some embodiments, one or both of the TOSA 300A and ROSA 300B further include systems and/or devices to aid in evaluation and diagnostic evolutions concerning their performance and/or the performance of related components and systems. By way of example, the TOSA 300A and/or ROSA 300B in such embodiments includes a log amplifier for use in conjunction with a monitor photodiode, such as PIN photodiode 302B or photodiode 304A, and/or current mirror circuitry.

Another aspect of some embodiments of the TOSA 300A is that they provide for a DC active bias for laser modulation. This eliminates the need for bias T modulation devices and circuitry such as are typically employed in laser modulation applications.

With continuing reference now to aspects of the exemplary PA/LD illustrated in FIG. 1, exemplary embodiments of the PA/LD 100 are configured to transmit, receive, and/or process a variety of different signals. Such signals may comprise, among other things, data and monitoring signals, control signals, or may be concerned with the transmission of power to/from various components. In this exemplary embodiment, the data signals are digital and include those signals designated RXIN+/− and RXOUT+/− and which denote, respectively, a data signal received from ROSA 300B, and a data signal transmitted by the PA/LD 100 to a customer. Similarly, the signals designated TXIN+/− and TXOUT+/− denote, respectively, a data signal received by the PA/LD 100 from a customer, and a customer data signal transmitted to TOSA 300A. In any case, the +/− designation refers to the fact that, in at least some embodiments, the signal channel consists of two data transmission lines of opposite polarities. Thus, in this exemplary implementation, the signal designated TXIN+/− actually comprises a first line TXIN+ and a second line TXIN−.

Note that, as suggested by the foregoing, the RXIN+/− and RXOUT+/− typically do not comprise discrete signals. Rather, the RXOUT+/− signal simply comprises a version of the RXIN+/− signal that has been modified, such as by way of changes to parameters such as its polarity, rise time, or amplitude, for example. The same is likewise true with respect to the TXIN+/− signal and the TXOUT+/− signal.

With continuing reference now to FIG. 1, PA/LD 100 is also configured to receive, via the digital control interface 202 of the digital IC controller 200, various control signals pertaining to the operation of the TOSA 300A and/or to the processing of the RXIN+/− data signal received by PA/LD 100 from ROSA 300B. Such control signals can be tailored according to any of a variety of variables. For example, the temperature of VCSEL 302A may be used as a basis for modifications or adjustments to a control signal relating, for example, to a bias point for a circuit element of PA/LD 100. Examples of such control signals are considered in further detail below.

Yet another exemplary control signal transmitted from the digital IC controller 200 to the PA/LD 100 is the TXD signal. In general, the TXD signal directs the PA/LD 100 to shut down the TOSA 300B. Shutdown of the TOSA 300B may be implemented, for example, when it is desired to power down a module to facilitate performance of diagnostics, or when there is a fault indication such as an internal short or excessive transmit power. As indicated in FIG. 1, the TXD signal may, in at least some cases, be transmitted from the digital IC controller 200 to the PA/LD 100 other than by way of the respective digital control interfaces of those components. Note that the same is likewise true with respect to the LOS signal for example, as discussed below.

In addition to the various control signals generated and transmitted to the PA/LD 100 by the digital IC controller 200, signals generated by one of the optical devices may likewise be used to aid in the control of those devices and/or for other purposes. By way of example, in the embodiment of PA/LD 100 illustrated in FIGS. 1 and 2, the TOSA 300A generates the TXI signal and transmits the TXI signal to the PA/LD 100. In general, the TXI signal received at the PA/LD 100 from the TOSA 300A indicates the level of current at which the TOSA 300A is operating. In this exemplary embodiment, the TXI signal serves as an input to a power supply circuit of the PA/LD 100 that is used to control the input voltage to the VCSEL (FIG. 1), as discussed in further detail below.

Note that in some cases, the TXI signal may be used for purposes other than implementing a control functionality. By way of example, some exemplary embodiments use the TXI signal to implement a monitoring functionality with respect to the VCSEL 302 current. Details concerning one such exemplary embodiment are provided below in conjunction with the discussion of the TXP signal.

As suggested earlier, embodiments of the PA/LD 100 are also configured to transmit, receive, and/or process a variety of monitoring signals pertaining to the operation and/or status of various components. One example of a monitoring functionality implemented by way of the PA/LD 100 is indicated by the LOS signal. Generally, the LOS signal is generated and transmitted by the PA/LD 100 to the digital IC controller 200 when the incoming data signal RXIN+/− has been lost, or otherwise fails to comport with certain established criteria.

Other exemplary monitoring functionalities related to, but not necessarily implemented by this exemplary embodiment of, the PA/LD 100, include the TXP signal transmitted from the TOSA 300A to the digital IC controller 200 indicating the optical power of the TOSA 300A. More particularly, the TXP is an electrical signal that is proportional to the optical power in the VCSEL 302A. A similar monitoring signal is generated with respect to the operation of the ROSA 300B. In particular, the RXP signal transmitted from the ROSA 300B to the digital IC controller 200 indicates the optical power of the ROSA 300B. Exemplarily, the RXP signal comprises an electrical signal that is proportional to the optical power in the ROSA 300B photodiode 302B.

Some of the monitoring signals, such as the TXP signal for example, may be used for purposes other than implementing a monitoring functionality. By way of example, some exemplary embodiments use the TXP signal as an input to a power supply circuit that is used to control the power input to the TOSA 300A.

In connection with the foregoing discussion of exemplary aspects of the TXP and TXI signals, it should be noted that the functionality of the TXP and TXI signals and, more generally, other signals disclosed herein, may be interchanged in some cases if necessary to suit the requirements of a particular application.

Figure 2:
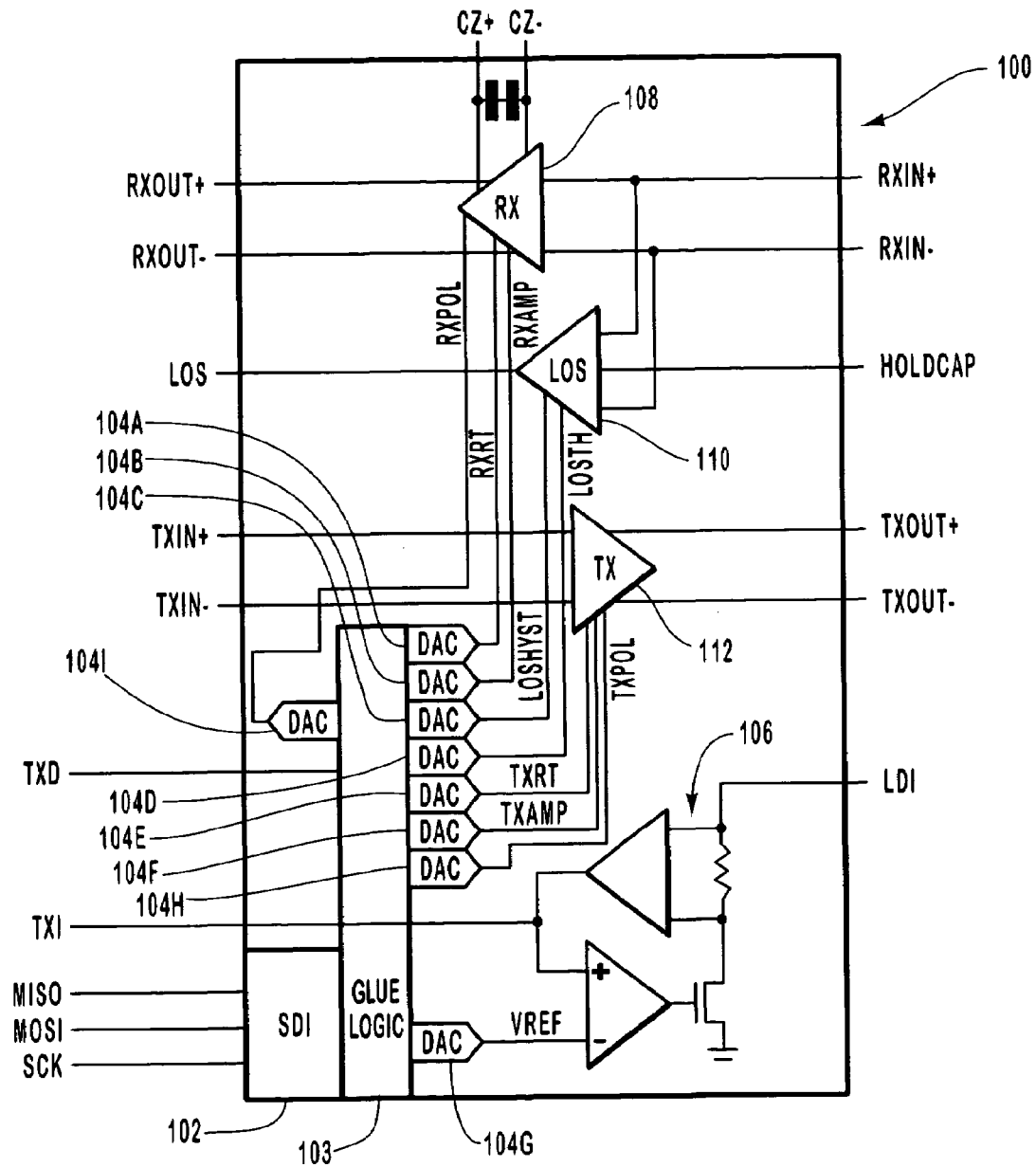
FIG. 2 is a schematic diagram that illustrates aspects of an exemplary embodiment of an integrated PA/LD that includes a digital control interface.

As noted earlier, the implementation of the PA/LD 100 illustrated in FIGS. 1 and 2 is configured so that the TXP signal provides a monitoring functionality with respect to TOSA 300A performance, and the TXI signal serves as the input to a power supply circuit that controls the power to the TOSA 300A. Alternatively however, other implementations of the PA/LD 100 may be configured so that the TXI signal provides the monitoring functionality with respect to TOSA 300A performance, while the TXP signal serves as the input to the power supply circuit that controls the power to the TOSA 300A. In either case, the monitoring signal may be provided to internal and/or external users. In yet other implementations of the PA/LD 100, the signal that provides the monitoring functionality may be omitted altogether. Thus, the foregoing are exemplary implementations and are not intended to limit the scope of the invention in any way.

In addition to the signals that implement various monitoring and control functionalities, yet other signals employed in conjunction with the PA/LD 100 concern aspects of PA/LD 100 operations such as power transmission and control. By way of example, the LDI signal is the actual DC bias current that is applied to the TOSA 300A to power the VCSEL 302A. As another example, the reference voltage signal VREF is an input to a feedback system that controls the input voltage to the VCSEL.

Of course, the enumeration and combinations of the various data, monitoring, power, control, and other, signals disclosed herein are exemplary only and are not intended to limit the scope of the invention. Accordingly, other exemplary embodiments of PA/LD 100 may include, implement or embody additional or alternative functionalities, as necessary to suit the requirements of a particular system or application. Moreover, feedback loops and circuits may be employed in connection with a variety of different signals, and combinations thereof, in the monitoring and/or controlling of the performance of various systems and devices. Thus, the scope of the invention should not be construed to be limited to the exemplary embodiments disclosed herein.

Directing attention now to FIG. 2, further details are provided concerning various aspects of the architecture of an exemplary embodiment of the PA/LD 100. As indicated there, the digital control interface 102 of this embodiment of the PA/LD 100 exemplarily comprises a three pin configuration adapted to receive master-in-slave-out ("MISO") and master-out-slave-in ("MOSI") control signals at 'data' and 'enable' pins, respectively, as well as a system clock ("SCK") signal, from the digital IC controller 200. While two and three pin serial interfaces are particularly useful in some embodiments of the invention, the serial interface may, more generally, be implemented as any industry standard, or customized, serial interface.

The digital control interface 102 communicates, in turn, with a plurality of DACs 104A through 104n by way of glue logic module 103. In the illustrated embodiment, nine DACs are provided, although the number may vary depending upon the requirements of a particular application or system. As discussed below, the DACs generally operate to convert a digital control signal into an analog signal that can be acted upon by the PA/LD 100. In this exemplary embodiment, some of the DACs comprise 8 bit DACs, but various other types of DACs may alternatively be employed.

As indicated in FIG. 2, the DACs in this exemplary embodiment are concerned with, respectively, the following signals: DAC 104A—RXRT (control transition time of RXIN+/−); DAC 104B—RXAMP (control amplitude of RXIN+/−); DAC 104C—LOSHYST (loss of signal hysteresis for RXIN+); DAC 104D—LOSTH (loss of signal threshold for RXIN−); DAC 104E—TXRT (control transition time of TXOUT+/−); DAC 104F—TXAMP (control amplitude of TXOUT+/−). In addition to the foregoing, a DAC 104G is provided that communicates with a power supply circuit 106 to control power input LDI to TOSA 300A by way of a reference voltage signal VREF. Further, DAC 104H and DAC 104I are provided that are generally concerned with, respectively, controlling the polarity of TXOUT+/− and RXOUT+/−. In some implementations, a feedback loop or circuit is provided that provides information concerning LDI.

With continuing reference to FIG. 2, various amplifiers, which exemplarily comprise radio frequency ("RF") amplifiers, are provided that communicate with respective DACs and generally act to implement certain actions specified by the control signal received by the PA/LD 100 from the digital IC controller 200. For example, the illustrated embodiment of PA/LD 100 includes an RX amplifier 108 that receives analog input from DACs 104A, 104B and 104I and modifies RXIN+/−, in accordance with such inputs, to produce RXOUT+/−. In the illustrated embodiment, RX amplifier 108 is configured to modify the transition time, amplitude and polarity of RXIN+/−.

Further, the RX amplifier 108 is exemplarily configured with CZ+/− ports for use in bypassing a feedback network, such as may be used to bias the RX amplifier 108. In this exemplary arrangement, a large, external capacitor placed between the CZ+/− ports. In other embodiments however, such biasing is achieved without the. need for the external capacitor, and hence the CZ+/− ports.

Additionally, an LOS circuit 110, exemplarily embodied as an amplifier, is provided that monitors RXIN+/− and transmits an LOS signal to the digital IC controller 200 when RXIN+/− exceeds, or falls below, a predefined threshold. Also, the LOS circuit 110 implements a hysteresis functionality to minimize or eliminate random switching of the LOS signal, usually caused by small variations in received signal strength or noise and often referred to as 'chatter,' that would likely otherwise result as RXIN+/− moves back and forth over the predefined threshold.

The illustrated embodiment of the PA/LD 100 further includes a TX amplifier 112 that receives analog input from DACs 104E, 104F and 104H and modifies TXIN+/−, in accordance with such inputs, to produce TXOUT+/−. In the illustrated embodiment, the TX amplifier 112 is configured to modify the transition time, amplitude and polarity of TXIN+/−. In at some embodiments, the TX amplifier 112 may be implemented as a plurality of amplifiers, each of which is concerned with the control of one of the transition time, amplitude and polarity of the TXIN+/− signal. In yet other embodiments, the TX amplifier 112 may be implemented as a single multistage amplifier so that all of the aforementioned control functionalities concerning the TXIN+/− signal are implemented by a single component. Note that the foregoing discussion is equally germane to the RX amplifier 108.

While the aforementioned exemplary embodiments are concerned with, among other things, control of data signal polarity, it may be useful in some instances to be able to control the polarity of other signals as well. By way of example, some embodiments additionally, or alternatively, provide for the control of the polarity of the LOS and TXD signals. As suggested by the foregoing example then, embodiments of the invention should not be construed to be limited to polarity control as applied to data signals.

Finally, it should be noted that signal polarity control may also be implemented with respect to analog data or other signals, as controlled by analog control signals. In exemplary implementations of this type, a digital control interface is not required, and a suitable analog control interface may be employed instead.

Figure 3:
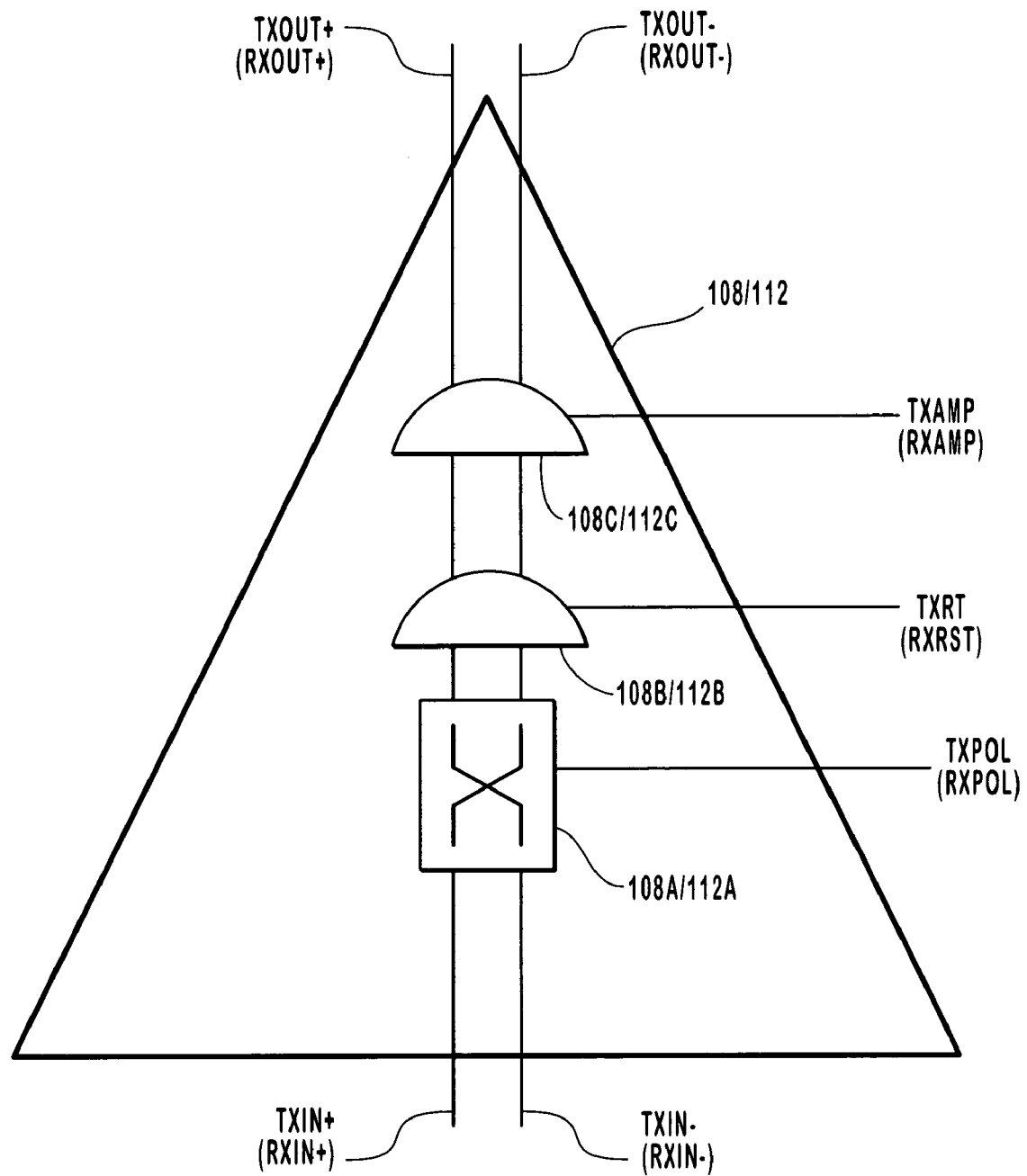
FIG. 3 is a schematic diagram that illustrates aspects of an exemplary embodiment of an amplifier such as may be employed to facilitate control of data signal polarity.

Directing attention now to FIG. 3, further details are provided concerning a control device, exemplarily embodied as RX amplifier 108 and TX amplifier 112, for controlling the polarity of a data signal. As suggested in FIG. 3, the same general configuration may be employed for RX amplifier 108 and TX amplifier 112. However, the components used to implement such configurations may vary depending on whether the RX amplifier 108 or the TX amplifier 112 is implemented. For example, in the case of the RX amplifier 108, a relatively larger number of gain stages may be employed since a relatively larger gain may be required. In the case of the TX amplifier 112 on the other hand, relatively large high-current transistors may be employed as necessary for the TX amplifier 112 to drive the required current to the load.

Exemplarily, the TX amplifier 108 includes a polarity inverter 108A, as well as two output stages 108B and 108C. Similarly, RX amplifier 112 includes a polarity inverter 112A and two output stages 112B and 112C. At least some embodiments of the TX amplifier 108, as well as the RX amplifier 112, further include an input stage (not shown) as well and may include additional output stages. The foregoing amplifier configurations are exemplary only however. In this regard, it was noted earlier herein that some embodiments of the invention may use multiple single-stage amplifiers instead of the multi-stage amplifier illustrated in FIG. 3. In general then, any amplifier or control device configuration useful in implementing the functionality disclosed herein may be employed.

The illustrated embodiments of TX amplifier 108 and RX amplifier 112 are each configured with three control inputs, though various other control inputs and combinations thereof may be employed. As discussed earlier, the TX amplifier 108 is configured to receive the TXPOL signal at the polarity inverter 108A, and to receive the TXRT and TXAMP signals at the 108B output stage and 108C output stage, respectively. Similarly, the RX amplifier 112 is configured to receive the RXPOL signal at the polarity inverter 112A, and to receive the RXRST and RXAMP signals at the 112B output stage and 112C output stage, respectively.

As discussed in greater detail below, the TX amplifier 108 uses the TXPOL, TXRT and TXAMP signals to generate an output signal TXOUT+/− having desired characteristics. Likewise, the RX amplifier 112 uses the RXPOL, RXRST and RXAMP signals to generated an output signal RXOUT+/− having desired characteristics.

It should be noted here that the various types and combinations of amplifiers, as well as their respective functionalities, disclosed herein are exemplary only. Various other types of control systems and devices may alternatively employed. In connection with the foregoing, the combinations of functionalities implemented by way of PA/LD 100 are, likewise, exemplary only and are not intended to limit the scope of the invention in any way. Accordingly, additional or alternative functionalities, and combinations thereof, may also be implemented by PA/LD 100, as necessitated by the requirements of a particular system or application.

C. General Aspects of PA/LD Operations

Figure 4:
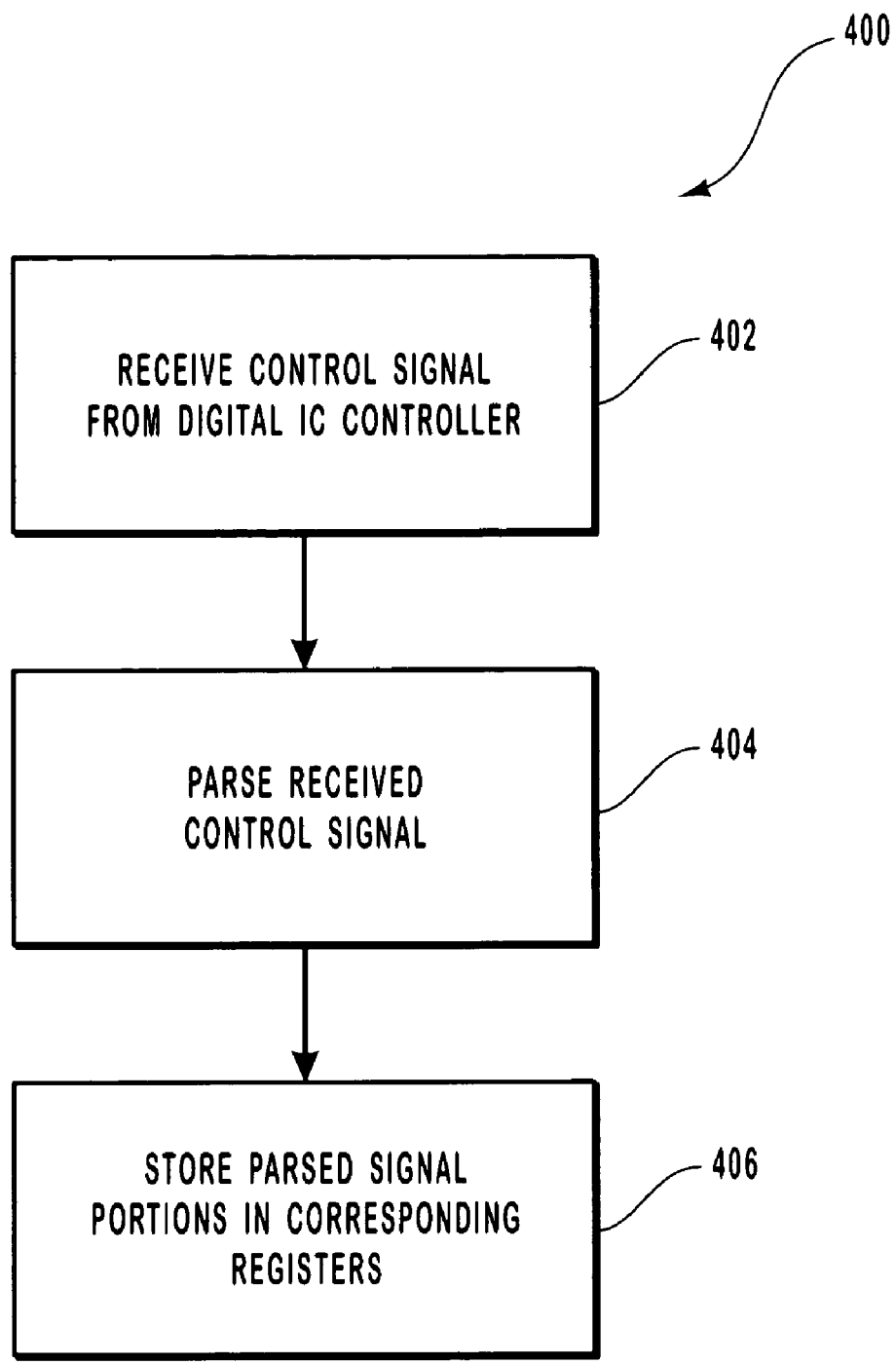
FIG. 4 is a flow diagram indicating aspects of an exemplary method for the processing of an incoming multiplexed digital control signal, such as may be produced by a digital IC controller.
Figure 5:
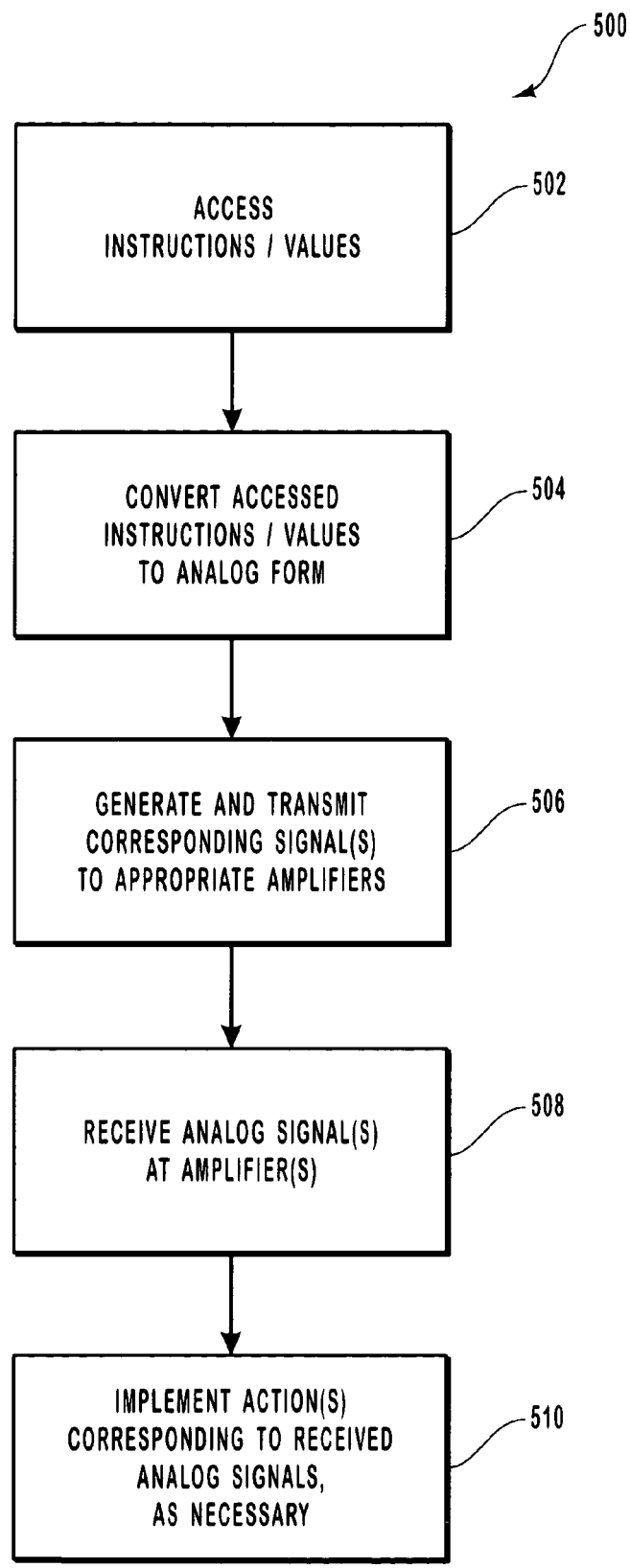
FIG. 5 is a flow diagram indicating general aspects of an exemplary method for using control signals and/or other signals to cause one or more control devices of the integrated PA/LD to perform various operations concerning a data signal received or transmitted by the integrated PA/LD.
Figure 6:
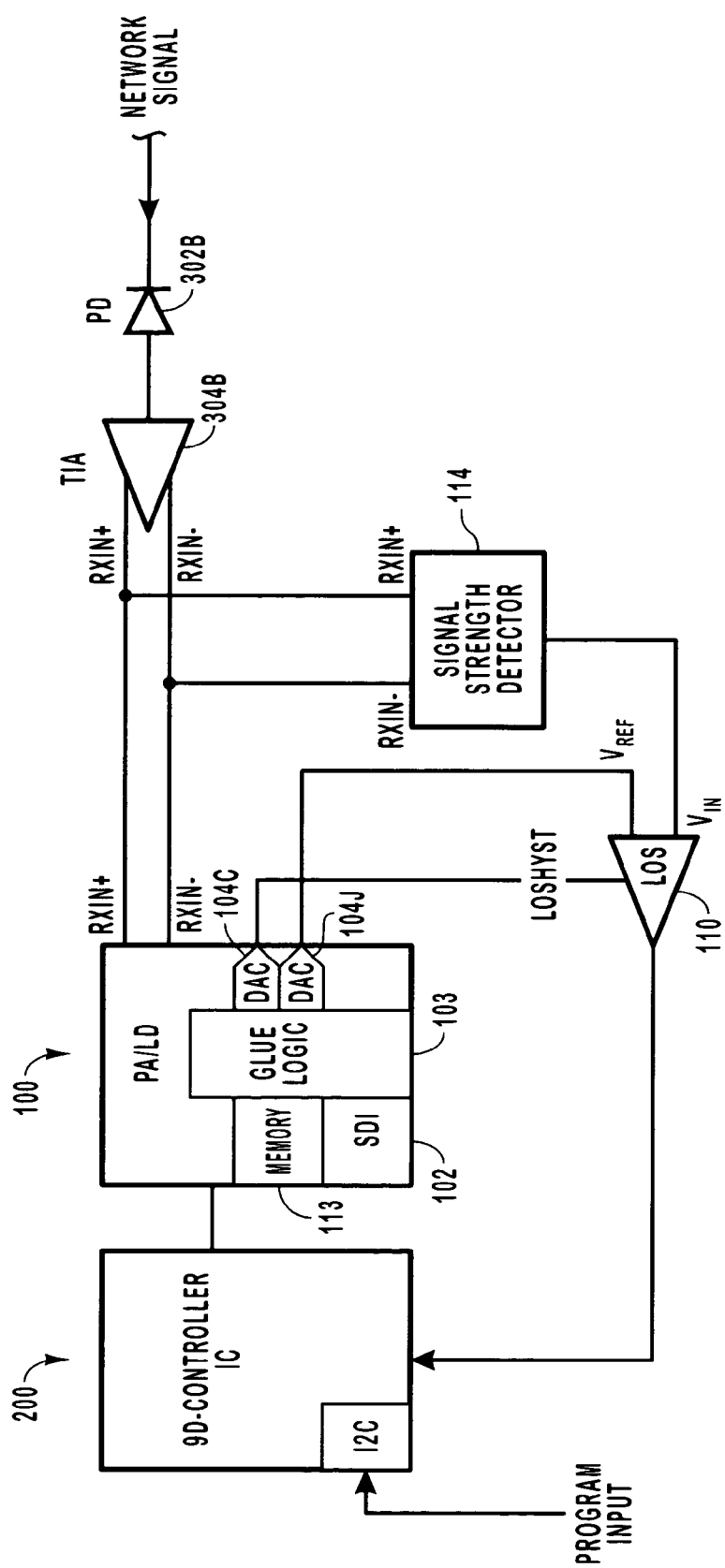
FIG. 6 is a schematic diagram that illustrates aspects of a device configured to programming of RXIN 'loss of signal' thresholds.

With continuing attention to FIGS. 1 through 3, and directing attention now to FIGS. 4 through 6, details are provided now concerning certain operational aspects of the illustrated embodiment of PA/LD 100 and various related components. With attention first to FIG. 4, aspects of an exemplary method 400 for receiving and processing an incoming control signal are illustrated.

In particular, at state 402, the control signal initially transmitted from the digital IC controller 200 is received at the PA/LD 100. Exemplarily, such signals relate to, among other things, the processing of TXIN+/− and RXIN+/−, the operation of TOSA 300A, and the disablement of PA/LD 100. Some of the control signals transmitted by the digital IC controller 200 may be received at the digital control interface 102 of PA/LD 100, while other control signals transmitted by the digital IC controller 200, such as the TXD signal, are received directly at the 'glue logic' module 103. This arrangement is exemplary only however, and various alternative schemes for receipt of incoming control signals at the PA/LD 100 may be implemented.

In general, the control signals transmitted by the digital IC controller 200 and received at the PA/LD 100 comprise one or more digital words, comprised of a defined sequence of digital bits, which may constitute instructions and/or parameter values. When the control signal has been received at PA/LD 100, state 404 is entered wherein the glue logic module 103 parses the control signal and directs the digital words, or portions thereof, into the various discrete instructions and/or parameter values.

After parsing has been completed, state 406 is entered. At this state, the glue logic module 103 directs the parsed segments of the data signal to the appropriate registers within the glue logic module. Because each register corresponds with a particular DAC, the parsed segments of the data signal can thus be stored in a manner consistent with the way in which the particular segment is to be employed. By way of example, a parsed segment of the control signal that concerns the threshold for the LOS signal is stored in a DAC that is configured to communicate with the LOS circuit 110.

At such time as the incoming control signal has been parsed and registered, the PA/LD 100 then performs various actions based upon the parsed instructions and/or values. Thus, control information concerning a wide variety of PA/LD 100 operations can be transmitted by way of a single control signal. Moreover, the control signal requires only a single digital interface at the PA/LD 100. This arrangement considerably simplifies the physical implementation of the PA/LD 100, as well as the processing of the incoming control signal.

Directing attention now to FIG. 5, details are provided concerning aspects of an exemplary process 500 for implementing actions based upon one or more control signals. As discussed below, FIG. 5 depicts only certain general aspects of such an exemplary process, and reference to more particular implementations is made after aspects of the process illustrated in FIG. 5 have been addressed.

In general, state 502 is entered wherein the glue logic module 103 accesses and retrieves the instructions and/or values stored in the various registers. Next, state 504 is entered wherein the applicable DACs convert the accessed instructions and/or values from digital to analog form. After this conversion has been completed, state 506 is entered and the applicable DACs generate and transmit corresponding analog signals to the appropriate amplifiers. In state 508, the appropriate amplifiers receive the analog signals and then move to state 510 where various actions are implemented with regard to the signals with which such amplifiers are concerned.

D. Aspects of Exemplary PA/LD Operations—TX Amplifier & TOSA

With more particular reference now to the input customer data signal TXIN+/− (FIG. 2), DACs 104E, 104F and 104G, respectively, convert the words, or portions thereof, relating to the TXIN+/− transition time, TXIN+/− amplitude and TXIN+/− polarity, to an analog form and then transmit the analog signals TXRT, TXAMP and TXPOL, as/if applicable, to TX amplifier 112.

In response, the TX amplifier 112 then adjusts the transition time, amplitude and/or polarity of TXIN+/− consistent with the TXRT, TXAMP and TXPOL signals, respectively, as necessary to convert signal TXIN+/− into a signal TXOUT+/− that is suitable for driving the VCSEL 302. The TXOUT+/− signal is then transmitted by the PA/LD 100 to VCSEL 302A of TOSA 300B. Of course, this operational scenario concerning the use of the combination of the TXRT, TXAMP and TXPOL signals is exemplary only and various other parameters of TXIN+/−, and combinations thereof, may be monitored and/or controlled as well.

With continuing attention to FIGS. 1 and 2, details are provided concerning exemplary operational aspects of the TOSA 300A. In the illustrated embodiment, the TOSA 300A receives the TXOUT+/− signal and the VCSEL 302A then transmits an optical signal (not shown) consistent with the received TXOUT+/−. In this way, the performance of VCSEL 302A can be adjusted and controlled in response to variables such as, but not limited to, temperature and voltage, so as to achieve transmission of an optical signal having certain desired properties or characteristics.

At substantially the same time as the VCSEL 302A transmits the optical signal, the photodiode 304A receives at least a portion of the optical signal transmitted by VCSEL 302A. Finally, the photodiode 304A generates and transmits the TXP signal to the digital IC controller 200, thereby indicating the optical power of the TOSA 300A. In this exemplary implementation, the TXP signal primarily serves to facilitate a monitoring functionality with respect to TOSA 300A performance. In addition to the TXP signal, the photodiode 304A also generates and transmits the TXI signal. As discussed in further detail below, the TXI signal is employed, in this exemplary embodiment, to facilitate control of TOSA 300A operations by way of power supply circuit 106.

In general, the power supply circuit 106 uses the TXI signal, in conjunction with the VREF signal, to vary, as necessary, the input current to the VCSEL 302A. As discussed earlier, the TXI is generated by the TOSA 300A and indicates the level of current at which the TOSA 300A is operating. On the other hand, the VREF signal represents a desired VCSEL 302A bias point. Typically, the value of the VREF signal, expressed as a signal reference voltage, is specified by digital IC controller 200 and transmitted to the PA/LD 100 as part of a control signal. The glue logic module 103 cooperates with DAC 104G to cause the generation and transmission of the VREF signal to the power supply circuit 106.

Thus, in the event that the feedback voltage from the TOSA 300A, indicated by or derived from the TXI signal, does not match the VREF signal reference voltage, then the power supply circuit 106 adjusts the LDI input to the TOSA 300A until a match is achieved. Thus, the power supply circuit 106 uses the feedback provided in the form of the TXI signal, in conjunction with the predetermined reference voltage provided in the form of the VREF signal, to determine and adjust, if necessary, the input power LDI to the VCSEL 302A and, thus, the optical power of the TOSA 300A. As noted earlier, the TXP signal may be employed in place of the TXI signal to provide similar control functionality with respect to TOSA 300A.

As an alternative to controlling various aspects of the TOSA 300A operations, it may be desirable in some instances to suspend the operation of TOSA 300A. To that end, the TXD signal is generated and transmitted by digital IC controller 200 to PA/LD 100 upon the satisfaction of certain conditions, and/or the occurrence of certain events, relating to the system. For example, the TXD signal would be generated and transmitted in the event of the occurrence of a predefined fault condition. In cases where the TXD signal has been generated and transmitted, the PA/LD 100 responds to the TXD signal by terminating transmission of the LDI signal to TOSA 300A, and thus data transmission by TOSA 300A, upon receipt of the TXD signal. Data transmission is then recommenced upon receipt, by the PA/LD 100, of an appropriate signal by way of the 'enable' pin of the digital control interface 102.

E. Aspects of Exemplary PA/LD Operations—RX and LOS Amplifiers & ROSA

It should be noted here that certain general aspects of an exemplary process 500 for using control devices such as amplifiers to implement actions concerning various optical devices, based upon one or more control signals received from a digital IC controller or other source, have already been discussed above in connection with FIG. 5. Accordingly, the following discussion will focus primarily on certain exemplary implementations of process 500 as they relate to the operation of the RX amplifier 108, the LOS circuit 110 and/or the ROSA 300B.

With respect first to the ROSA 300B, it was noted earlier that ROSA 300B converts an optical input signal, received at photodiode 302B, into the electrical signal RXIN+/− which is then received by the PA/LD 100. In general, the PA/LD 100 controls various aspects of the RXIN+/− signal, in accordance with a control signal received from the digital IC controller 200. The modified RXIN+/− signal is then transmitted by the PA/LD 100 to the customer as the RXOUT+/− signal.

Aspects of an exemplary process for performing various operations concerning the RXIN+/− signal generated by the ROSA 300B will now be considered in further detail. In particular, DACs 104A, 104B and 104I, respectively, convert the words, or portions thereof, of the control signal relating to the RXIN+/− transition time, RXIN+/− amplitude and RXIN+/− polarity, to an analog form and then transmit the analog signals RXRT, RXAMP and/or RXPOL, to RX amplifier 108. The RX amplifier 108 then adjusts, if necessary, the transition time, amplitude and/or polarity of RXIN+/− consistent with the received RXRT, RXAMP and/or RXPOL signals, respectively. The modified RXIN+/−, denoted as output signal RXOUT+/−, is then transmitted by the PA/LD 100 to the customer. It should be noted that the foregoing operational scenario concerning processes relating to the RXIN+/− signal is exemplary only and various other parameters of RXIN+/− may be monitored and/or controlled as well.

In addition to the RXIN+/− signal discussed above, ROSA 300B also generates the RXP signal which provides feedback to digital IC controller 200 concerning the optical power of photodiode 302B. In general, signals concerning ROSA 300B performance, and/or the performance of TOSA 300A, such as the RXP, TXP and TXI signals, may be generated and transmitted substantially continuously, or on any other desired basis.

In addition to controlling various parameters of RXIN+/−, some embodiments of PA/LD 100 are also configured to monitor, and report on, aspects of the status of RXIN+/−. In one exemplary embodiment, DACs 104C and 104D convert the hysteresis and threshold data, received from digital IC controller 200 as words or portions thereof, to an analog form and then transmit, respectively, the LOSHYST and LOSTH signals to the LOS circuit 110. The LOS circuit 110 then monitors RXIN+/− and transmits the LOS signal to the digital IC controller 200 when RXIN+/− exceeds, or falls below, a predefined threshold, and/or when no data is detected in the RXIN+/− signal.

Finally, the LOS circuit 110 also implements a hysteresis functionality to minimize or eliminate chatter on the LOS signal that may otherwise result as RXIN+/− moves back and forth over the predefined threshold. In particular, in the event that RXIN+/− moves below the predefined threshold, it must drop substantially below that threshold before the LOS signal will be generated and transmitted. The same is likewise true in the case where RXIN+/− moves above the predefined threshold. The upper and/or lower thresholds may be defined as necessary to suit the requirements of a particular application. In some embodiments of the invention, such loss of signal functionality may also be implemented with respect to the customer signal RXIN+/−.

F. Aspects of Exemplary Signal Polarity Control—RX and TX Amplifiers

As noted earlier, the functionality implemented by the RX amplifier 108 and the TX amplifier 112 includes, among other things, controlling the polarity of the output data signals RXOUT+/− and TXOUT+/−, respectively.

Accordingly, one aspect of the data signal polarity control functionality provided by embodiments of the invention is that it allows for a relatively higher degree of flexibility in terms of the layout and implementation of the components that comprise the PA/LD 100 and related systems. In particular, because the polarity of data signals received at the PA/LD 100 can be readily modified, prior to further transmission, in response to a control signal, it is of little consequence that a data signal entering the PA/LD is improperly polarized, since the polarity can be corrected before the PA/LD 100 transmits the data signal on to the next user.

Moreover, the use of a digital control interface also enhances the ease with which data signal polarity control can be implemented. In particular, the digital control interface is adapted for use with data, representing multiple control parameters, that have been multiplexed into one, or a few, control signals. Thus, signal polarity control can be implemented easily and without compromising the number and type of other control parameters that can be multiplexed into the control signal.

Control of such output data signal polarity may be accomplished in various ways. Some exemplary implementations are addressed below, however, other processes and methods may alternatively be employed.

With reference to use of the TXPOL signal for example, the polarity of the output data signal TXOUT+/− is changed by electronically crossing-over the TXIN+ and TXIN− propagation paths, which causes the TXOUT+ signal to propagate along the path along which the TXOUT− signal would otherwise have propagated, and vice-versa. The foregoing polarization adjustment scheme is likewise germane to data signal polarity adjustments made by the RX amplifier 108 to RXOUT+/− in response to the RXPOL signal.

In another case, the signal inversion can be accomplished by reprogramming a positive gain block to be a negative gain block, or vice versa. As another example, the data path can be programmed to pass through either a positive gain block or through a negative gain block. More generally however, any device and/or process, or combination thereof, that is effective in modifying and/or maintaining, as applicable, the relationship between the data paths so that the appropriate significance can be assigned to the detected differential between the two paths, may be employed.

As suggested by the foregoing, a variety of means may be employed to perform the functions disclosed herein, of an amplifier or other control device. Thus, the embodiments of the amplifiers disclosed herein are but exemplary structural implementations of a means for controlling signal polarity and, as such, those exemplary implementations should not be construed as limiting the scope of the present invention in any way. Rather, any other structure or combination of structures effective in implementing the functionality disclosed herein may likewise be employed.

G. General Aspects of a Programmable Transceiver

As discussed above, it is useful to be able to control various aspects of the operation of the PA/LD and, more broadly, the associated transceiver, in order to accommodate changes in environmental and operating conditions, and to enhance the overall operational flexibility of the associated transceiver, systems, and devices. Accordingly, at least some embodiments of the invention are configured to enable ready implementation of changes concerning aspects of their performance and operation.

More particularly, exemplary embodiments of the invention are directed to programmable transceivers and other devices that are configured to enable a user to program, and reprogram, the transceiver or device such that the transceiver or device operates in a desired manner. As discussed in further detail below, references herein to 'programmable' devices refers generally to the capability of such devices to receive, store, process, execute and/or modify signal parameter programming instructions. Exemplary embodiments of the invention are additionally, or alternatively, configured so that the adjustments to the performance and operation of the transceiver or device can be performed "on-the-fly" while the transceiver or device is in an operating mode.

Implementation of one or both of the aforementioned functionalities, in connection with the feedback and control aspects discussed earlier herein, means that exemplary embodiments of the transceiver are able to readily accommodate a dynamic operating environment, as exemplified by changes in protocols, line rate variations, changes in operating requirements and operating conditions, and other considerations that relate to or implicate in some way the operation and performance of the transceiver. With further general reference to the aforementioned feedback and control aspects, exemplary embodiments of the invention are configured with feedback systems to ensure that the performance of a particular system, device, or component remains within a defined range, notwithstanding that the defined range can be readily reprogrammed.

Attention is now directed to various general aspects of an exemplary implementation of a programmable transceiver. As suggested above, the transceiver can be programmed at various times, and in various ways, to achieve certain operational and performance results. For example, it is often useful to specify and/or modify, through suitable programming, various parameters of signals asserted and/or de-asserted by, or in connection with, the PA/LD, where such signals include, but are not limited to, data, monitoring, power, and control signals.

The signal parameters that can be programmed in connection with implementations of the invention are virtually unlimited. Examples of programmable signal parameters include, but are not limited to, signal rise time, signal polarity, signal amplitude, and signal fall time. Other aspects concerning signals, such as signal assertion and de-assertion thresholds (sometimes also referred to as signal "trip levels") may be programmed as well.

As suggested by the foregoing, exemplary embodiments of the invention are concerned both with the programming of various characteristics of the actual signal, such as polarity and amplitude for example, as well as with the programming of aspects of the signal that, while not comprising a characteristic specific to a signal, nonetheless relate to the signal in some way, such as assertion and de-assertion thresholds of a signal. Such signal characteristics and signal aspects may be referred to collectively herein as "signal parameters."

Various factors may influence the need to program and/or reprogram one or more signal parameters. By way of example, a change in the line rate of the system in connection with which the transceiver is employed, such as from a 2 gigabit/s rate to a 10 gigabit/s rate, implicates a change in the level of power that is incident on the optical receiver of the transceiver. In this example, such a change in incident power, accordingly necessitates, among other things, reprogramming of the LOS assert and deassert thresholds. These changes would also be necessitated where, for example, it is desired to remove the transceiver from a system having a first line rate, and install the transceiver in a system having a second, different, line rate.

Other factors may likewise necessitate the reprogramming of one or more signal parameters. For example, a system protocol change, such as may occur when a system is upgraded, or when the transceiver is removed from one system and installed in another, would require changes to any number of signal parameters.

In similar fashion, environmental conditions may play a significant role in determining whether or not reprogramming of signal parameters is required. For example, changes in the operating temperature of the system and/or transceiver often implicate a need to reprogram the rise and fall times of certain signals.

With reference to one particular example, it is sometimes desirable to provide for thermally-based correction of a $V_{REF}$ input to a power supply circuit (see FIGS. 1 and 2). In some implementations, such corrections are performed in connection with input received from an appropriate temperature sensor associated with the transceiver. In this example, a particular $V_{REF}$ is programmed that causes an increase in the power transmitted to the TOSA 300A when the temperature of the system, TOSA 300A, or other elements, components or devices falls within a predefined temperature band.

It should be noted that the foregoing is not intended to be, nor is, an exhaustive list of factors that may implicate the programming and/or reprogramming of one or more parameters of the signals with which the transceiver, and related systems and devices, are concerned. Rather, the aforementioned factors simply serve to exemplify situations and conditions that may bear on the desirability and need to program the transceiver.

As suggested above, one aspect of exemplary embodiments of the invention is that they permit ready programming and/or reprogramming of the transceiver so that various signal parameters can be modified may be necessary to accommodate factors such as line rate and protocol changes, as well as environmental factors such as temperature. More particularly, exemplary embodiments of the invention are configured to enable at least two different programming modes, which may be used together, or in the alternative.

In a first programming mode, a user is able to customize the performance and operation of the transceiver consistent with the requirements of a particular application row or situation by specifying certain signal parameter values. In the event that changes to one or more of such parameters are desired, the user can simply reprogram the transceiver accordingly.

A second programming mode that is additionally, or alternatively, employed by exemplary embodiments of the invention is an "on-the-fly" programming mode where one or more signal parameters are changed or adjusted automatically in response to changes in system protocols, line rates, operating requirements, operating conditions, and other considerations that relate to the operation and performance of the system or device. In this programming mode, no user input is required beyond the initial programming of the device. In some implementations of this programming mode, relationships are established between and among two or more signal parameters so that in the event that one parameter is reprogrammed, other parameters may likewise be automatically reprogrammed, in accordance with the established relationship(s).

Various techniques may be employed in the programming of the transceiver. With reference to the first programming mode noted above, such programming is exemplarily implemented, with a suitable processor and software, by way of the I2C bus 204 and appropriate DACs of the digital IC controller 200 (see FIG. 1), but may be implemented in other ways as well. In some implementations, the processor comprises an element of the transceiver, while in other cases, the processor may be external to the transceiver.

As to "on-the-fly," or dynamic, programming, various devices and techniques may be employed to this end. For example, some exemplary implementations of the transceiver are programmed with algorithms that monitor one or more predetermined system characteristics and performance such as, but not limited to, temperature, line rate and system protocol, and operate in conjunction with corresponding DACs and/or other systems and devices to automatically change predefined parameters of one more designated signals accordingly. Thus, the DACs may, in various implementations of the invention, be programmed, dynamically controlled, or both, as desired to obtain particular results. Exemplarily, any such changes in programming are logged and/or transmitted to a computer or other monitoring device for tracking and evaluation by system operators. Monitoring of the algorithm in this way enables system operators to identify changes that may be required to the algorithm.

At least some of the aforementioned algorithms include or employ features such as lookup tables that are consulted periodically, or on an as-needed basis, and that provide signal parameter values for implementation by the algorithm. In some implementations of the invention, the algorithm operates in connection with hardware such as temperature detectors and protocol detector circuits which provide input to the algorithm that is then used to make a determination as to whether or not a signal parameter change is required. Of course, the foregoing are exemplary implementations only, and various other combinations of hardware and software may likewise be employed in connection with the dynamic control of the transceiver.

H. Exemplary Programmable Signal Parameters

As discussed above, it is desirable to adjust various parameters of signals with which the PA/LD and associated transceiver are concerned. The assert and de-assert thresholds for the LOS signal generated by the LOS amplifier comprise but one example of such a signal parameter. Directing attention once more to FIG. 2, and to FIG. 6 as well, details are provided concerning an exemplary implementation of the invention that provides for, among other things, programmable RXIN+/− LOS trip levels. In general, programmable LOS trip levels enable a device to be readily adapted to changing system conditions, protocols and line rates while, at the same time, allowing for a relatively more narrow range of trip conditions and, thus, a relative improvement in the sensitivity and performance of the programmable device.

With attention now to FIG. 6 in particular, a schematic diagram is presented that illustrates various aspects of a device configured to enable programming of RXIN+/− LOS thresholds. It should be noted here that, in order to facilitate discussion, exemplary embodiments of the digital IC controller 200 and the PA/LD 100 are presented in FIG. 6 in a somewhat simplified form, and further details concerning exemplary implementations of those components can be obtained with reference to FIGS. 1 and 2. Moreover, while the LOS circuit 110 is indicated in FIG. 6 as separate from the PA/LD 100, the LOS circuit 110 likewise comprises a portion of the PA/LD 100 in implementations such as that illustrated in FIG. 2. Finally, at least some implementations of the PA/LD include a memory 113 that enables storage of algorithms and other materials and instructions such as may be used in connection with the programming and reprogramming of signal parameters. In other cases, the memory 113 may reside elsewhere on the PCBA (FIG. 1), or may be implemented within the digital IC controller 200.

As indicated in FIG. 6, a photodiode 302B and transimpedance amplifier 304B are configured to receive the optical data signal from the network. It was noted above that the +/− designation implemented in RXIN+ and RXIN−, as output from the transimpedance amplifier 304B, refers to the fact that, in at least some embodiments, the signal channel consists of two data transmission lines of opposite polarities. In any case, the RXIN+ and the RXIN− signals are transmitted to the PA/LD100.

Further, a signal strength detector 114 is provided that is configured to tap into the data channels RXIN+ and RXIN−. As further indicated in FIG. 6, the signal strength detector 114 communicates with the LOS circuit 110 which, in turn, is configured to receive an input from DAC104J and transmit an output to the digital IC controller 100. In one exemplary implementation, the signal strength detection 114 is compatible with one or more "Multisource Agreements" ("MSA"s) and comprises a wired OR, single-ended, open-drain complementary metal oxide semiconductor ("CMOS") compatible output that requires an external pull-up resistor. This implementation of the signal strength detector is configured so that adequate optical input power incident on the photodiode 302B causes a "HIGH" output to be generated.

Conversely, if the optical power incident on the photodiode 302B is below a desired range or threshold, a fault condition is indicated, specifically, a "LOW" output is generated. In either case, the output of the signal strength detection 114 is a voltage, denoted $V_{IN}$ in FIG. 6, that corresponds to the strength of the detected signal.

The foregoing is an exemplary implementation however. More generally, the signal strength detector 114 that such device can comprise any device or combination of devices capable of determining the level of optical power incident on the photodiode 302B.

With continuing reference to FIG. 6, the digital IC controller 200 includes an I2C bus 204 that, as suggested above, is configured to receive program input concerning signal parameters such as, but not limited to, assertion and deassertion thresholds for LOS. Generally, such programming input results in an output from DAC 104J of the PA/LD in the form of a reference voltage, denoted at $V_{REF}$, that corresponds to a desired threshold.

In operation, an optical data signal is received, from the network, at the photodiode 302B of the ROSA 300B and is passed to the transimpedance amplifier 304B where it is resolved into RXIN+ and RXIN− which are then passed to the PA/LD 100. Information concerning the strength of the signal RXIN+ and RXIN− is simultaneously passed to the signal strength detector 114 which then generates a voltage denoted $V_{IN}$ that corresponds to the strength of the detected signal. At substantially the same time, the DAC 104J outputs the $V_{REF}$ signal that represents a voltage that corresponds to a programmed LOS assertion, or deassertion, threshold. In general, the LOS circuit 110 compares $V_{REF}$ received from DAC 104J with $V_{IN}$ received from the signal strength detector 114 and, depending upon the results of such comparison, performs a corresponding action. More specific details concerning aspects of particular LOS assertion and deassertion thresholds are provided below.

For example, if the comparison of $V_{REF}$ with $V_{IN}$ reveals that $V_{IN}$ falls outside an acceptable predetermined range of variance with regard to $V_{REF}$, thereby indicating that the received signal strength has fallen below a predetermined level for example, the LOS circuit 110 asserts the LOS signal. If, on the other hand, the results of such comparison reveal that the received signal strength is within an acceptable range, no LOS signal is asserted. In the third case, where the LOS signal has been asserted and it has subsequently determined at the LOS circuit 110 that the signal strength is again within an acceptable predetermined range, then the LOS signal is deasserted.

As noted earlier in connection with the discussion in FIG. 2, the LOS circuit 110 is also responsive to the LOSHYST signal which implements a hysteresis functionality with respect to the assertion and deassertion of LOS so as to reduce or eliminate system chatter. In the present exemplary embodiment however, the LOSTH input to the LOS circuit 110 is not required since the LOS circuit 110 receives $V_{REF}$ from DAC 104J and uses $V_{REF}$ in combination with $V_{IN}$ to determine when LOS will be asserted or deasserted. The hysteresis functionality implemented in connection with assertion and deassertion of LOS may usefully be implemented in connection with the assertion and/or transmission of other signals as well.

As suggested above, the programming of LOS assert and deassert thresholds can be implemented by way of the I2C bus 204. In one exemplary alternative embodiment, the PA/LD 100, the digital IC controller 200, and/or other portion of the associated optical transceiver, are programmed with an appropriate algorithm to change the LOS assert and deassert thresholds automatically upon the occurrence of particular system events or operating conditions. In yet other implementations, provision is made both for program input by way of the I2C bus 204, as well as algorithm-based programming. Accordingly, the scope of the invention should not be construed to be limited to any particular embodiment of a programmable transceiver or other device.

With continuing reference now to FIG. 6, further details are provided concerning various aspects of the programmable LOS assert and LOS deassert thresholds. As noted earlier, an exemplary basis for the assertion and deassertion of the LOS is the level of power incident on the photodiode 302B and a particular threshold at which LOS will be asserted in programmed, exemplarily, through the I2C bus 204. Correspondingly, an exemplary basis for deassertion of LOS is the level of power incident on the photodiode 302B and, as well, the specific power threshold at which LOS will be deasserted is programmed through the I2C bus 204. The response rate of the LOS assertion and deassertion, exemplarily measured in microseconds, should generally be consistent with the desired operational parameters for the system and, in any event, should be such as to enable the system to function efficiently and effectively.

Other aspects concerning the assertion and deassertion of the LOS signal may be specified as well and include, but are not limited to, the accuracy of the power of thresholds for assertion and deassertion of LOS, as well as the range of assertion and deassertion thresholds that can be selected. Typically, the range of such thresholds will be selected with reference to the RXIN+/− sensitivity of the maximum data rate associated with the system, and should be such as to insure that the bit error rate of the data stream is within an acceptable range. Finally, the system should be configured so as to allow modifications to the resolution of both the assert and deassert thresholds for the LOS signal. As noted earlier herein, one aspect of exemplary embodiments of the invention is that they are configured for use with a wide variety of data rates, system protocols and other variables. Accordingly, at least some embodiments of the invention are configured to store LOS assert and deassert power ranges for a plurality of different data rates. The same is more generally true with respect to other signal parameters as well.

With respect to the foregoing, it should further be noted that at least some implementations of the invention are configured to automatically detect the data rate of the system in connection with which the device is employed, and then access corresponding assert and deassert thresholds from, for example, a lookup table, thereby facilitating assertion and deassertion of the LOS signal in a way that is consistent with the detected data rate. In at least some cases, detection of the data rate is achieved indirectly by way of a protocol detection circuit that determines a particular protocol of the system and then derives from that protocol information the corresponding data rate.

As discussed above, embodiments of the invention are configured to enable the programmability of a wide variety of signal parameters. One such example, discussed above, concerns the programming of the LOS circuit 110 regarding the thresholds for assertion and deassertion of the LOS signal. Exemplary embodiments of the invention enable programming of various other signal parameters as well. With renewed attention now to FIGS. 1 and 2, details are provided concerning one such example.

In particular, exemplary embodiments of the invention enable programmability of the power supply circuit 106 that generates the power input LDI to the TOSA 300A. As indicated above, in connection with the initial discussion of FIGS. 1 and 2, the power supply circuit 106 adjusts the input power, represented as signal LDI, to the TOSA 300A, with reference to a TXI feedback signal and a reference voltage, denoted $V_{REF}$, that is defined in connection with DAC 104G. Generally, $V_{REF}$ represents a predetermined reference voltage that, when compared with TXI, serves to determine the transmitted to the TOSA 300A. In the event that the difference between the reference signal $V_{REF}$ and the feedback signal TXI falls, for example, below an acceptable level, the power supply circuit 106 will increase the power LDI until such time as the feedback signal TXI, considered in connection with $V_{REF}$, indicates that the power output from the power supply circuit 106 meets a predetermined level.

In this exemplary implementation, the performance of the power supply circuit 106 can, as suggested above, be controlled or modified by programming different $V_{REF}$ values. Similar to the other exemplary implementations discussed herein, such programming can be accomplished by way of a program input to the I2C bus 204 of the digital IC controller 200 or, alternatively, may be implemented by way of an algorithm or other programming internally coded within the PA/LD 100 and/or the digital IC controller 200. By changing $V_{REF}$ in this way, the differential between $V_{REF}$ and TXI is modified as well, thereby implicating a change in the power LDI that is transmitted to the TOSA 300A. Changes to the output power LDI of the power supply circuit 106, such as are implemented by way of the programming or reprogramming of one or more predetermined $V_{REF}$ values, has various useful implications.

By way of example, changes to the data transmission rate associated with the PA/LD can be implemented, at least in part, by way of such programming of $V_{REF}$. That is, the output of TOSA 300A, as a function of the input power LDI, can be desirably adjusted. Consequently, the PA/LD100 is not necessarily constrained for use in connection with a single data rate or limited range of data rates. Rather, the PA/LD100 and, more generally, the associated transceiver, collectively compromising the TOSA 300A, ROSA 300B, digital IC controller 200, and PA/LD100, can be programmed and/or reprogrammed as desired to accommodate a wide range of data transmission rates. As an example, an optical transceiver in accordance with the invention and initially programmed for use in connection with an OC3 transmission rate, can be readily reprogrammed for use in connection with the systems having an OC12 data rate. Thus, the programmability of the transceiver lends considerable flexibility to the transceiver in terms of the various systems and data rates in connection with which it may be employed.

In similar fashion, the power supply circuit 106 may also be programmed to compensate for system operating temperatures and environmental conditions that may affect LDI power output from the power supply circuit 106 and, accordingly, TOSA 300A transmission rates. In this exemplary implementation, the transceiver includes a temperature sensor arranged for operation in connection with the power supply circuit 106 so that changes in output power LDI can be implemented automatically in response to detection of particular thermal conditions that, exemplarily, comprise a portion of the programming for the transceiver.

It should be noted in connection with the aforementioned implementations of the invention concerned with the programming of LOS thresholds and output power LDI that those are exemplary implementations only and are not intended to limit the scope of the invention in any way. In general, and as discussed above, exemplary implementations of the invention enable the programmability of any of a variety of combinations of the exemplary signal parameters suggested in FIGS. 1 and 2 or otherwise disclosed herein.

More generally, the embodiments of the invention extend to any transceiver configured to enable the programming of various aspects of the performance of the transceiver relating to, for example data transmission and reception, signal monitoring, signal control and power transmission. Accordingly, the scope of the invention should not be construed to be limited solely to the exemplary embodiments disclosed herein.

I. Computing Environments

Embodiments of the present invention may be implemented in connection with a special purpose or general purpose computer including, various computer hardware as discussed in greater detail below. Embodiments within the scope of the present invention also include computer-readable media for carrying or having computer-executable instructions or electronic content structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or electronic content structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, or special purpose processing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of the program code means for executing steps of the methods disclosed herein. The particular sequence of such executable instructions or associated content structures represent examples of corresponding acts for implementing the functions described in such steps.

Of course, the invention may be practiced in network computing environments with many types of computer system configurations, including personal computers, handheld devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment for example, program modules may be located in both local and remote memory storage devices.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. An integrated post-amplifier and laser driver assembly for use in connection with an optical receiver and an optical transmitter, comprising:
 a post-amplifier assembly configured for communication with the optical receiver;
 a laser driver assembly configured for communication with the optical transmitter;
 a digital control interface in at least indirect communication with the post-amplifier assembly and the laser driver assembly; and
 means for setting a signal parameter in response to signal parameter programming instructions, the signal parameter corresponding to a signal associated with at least one of: the post-amplifier assembly; and, the laser driver assembly, wherein the signal parameter includes polarity.

2. The integrated post-amplifier and laser driver assembly as recited in claim 1, wherein the post-amplifier assembly and laser driver assembly are integrated together in a single IC.

3. The integrated post-amplifier and laser driver assembly as recited in claim 1, wherein the means for setting a signal parameter enables dynamic control of one or more signal parameters.

4. The integrated post-amplifier and laser driver assembly as recited in claim 1, wherein the means for setting a signal parameter operates in response to signal parameter programming instructions received, at least indirectly, from an algorithm encoded within the integrated post-amplifier and laser driver assembly.

5. The integrated post-amplifier and laser driver assembly as recited in claim 1, wherein the means for setting a signal parameter enables implementation of a signal parameter change that corresponds to a change in thermal conditions associated with the integrated post-amplifier and laser driver assembly.

6. The integrated post-amplifier and laser driver assembly as recited in claim 1, wherein the signal to which the signal parameter corresponds is selected from the group consisting of: control signals; data signals; power signals; and, monitor signals.

7. The integrated post-amplifier and laser driver assembly as recited in claim 1, wherein the digital control interface comprises a serial digital interface.

8. The integrated post-amplifier and laser driver assembly as recited in claim 1, further comprising a means for controlling signal polarity arranged for operation with respect to a data signal associated with the integrated post-amplifier and laser driver assembly.

9. The integrated post-amplifier and laser driver assembly as recited in claim 1, wherein the integrated post-amplifier and laser driver assembly is compatible with a plurality of protocols and line rates.

10. The integrated post-amplifier and laser driver assembly as recited in claim 1, wherein the means for setting a signal parameter operates in response to signal parameter programming instructions received, at least indirectly, from a user.

11. In a high-speed data communications system that includes an optical receiver and an optical transmitter, an integrated post-amplifier and laser driver assembly, comprising:
 a post-amplifier assembly configured for communication with the optical receiver;
 a laser driver assembly configured for communication with the optical transmitter and implemented together with the post-amplifier assembly in a single IC;
 a digital control interface;
 a glue logic module in communication with the digital control interface and in at least indirect communication with the post-amplifier assembly and the laser driver assembly; and
 a digital to analog converter configured to receive signal parameter programming instructions concerning the setting of a signal parameter, the digital to analog converter being in communication with the glue logic module and at least one of the post-amplifier assembly; and, the laser driver assembly.

12. The integrated post-amplifier and laser driver assembly as recited in claim 11, wherein the digital to analog converter is configured to receive signal parameter programming instructions from a user or an algorithm encoded within the integrated post-amplifier and laser driver assembly.

13. The integrated post-amplifier and laser driver assembly as recited in claim 11, wherein the signal parameter programming instructions concern LOS assert and deassert thresholds.

14. The integrated post-amplifier and laser driver assembly as recited in claim 11, wherein the signal parameter is selected from the group consisting of: signal rise time; signal polarity; signal assert threshold; signal deassert threshold; signal fall time; signal amplitude; and, signal power.

15. The integrated post-amplifier and laser driver assembly as recited in claim 11, wherein the signal to which the signal parameter corresponds is selected from the group consisting of: control signals; data signals; power signals; and, monitor signals.

16. The integrated post-amplifier and laser driver assembly as recited in claim 11, further comprising an LOS circuit in at least indirect communication with the optical receiver and the digital control interface.

17. The integrated post-amplifier and laser driver assembly as recited in claim 11, wherein the post-amplifier assembly includes an amplifier having a data signal polarity control stage.

18. The integrated post-amplifier and laser driver assembly as recited in claim 11, wherein the integrated post-amplifier and laser driver assembly is compatible with a plurality of system protocols and line rates.

19. The integrated post-amplifier and laser driver assembly as recited in claim 11, wherein the signal parameter includes a signal rise time.

20. The integrated post-amplifier and laser driver assembly as recited in claim 11, wherein the signal parameter includes a signal polarity.

21. The integrated post-amplifier and laser driver assembly as recited in claim 11, wherein the signal parameter includes a signal assert threshold and a signal deassert threshold.

22. The integrated post-amplifier and laser driver assembly as recited in claim 11, wherein the signal parameter includes a signal fall time.

23. The integrated post-amplifier and laser driver assembly as recited in claim 11, wherein the signal parameter includes signal amplitude.

24. An optical transceiver, comprising:
   an optical transmitter;
   an optical receiver;
   a digital IC controller; and
   an integrated post-amplifier and laser driver assembly in communication with the digital IC controller, the integrated post-amplifier and laser driver assembly being programmable with respect to at least one signal parameter of at least one signal, and comprising:
      a post-amplifier assembly configured for communication with the optical receiver;
      a laser driver assembly configured for communication with the optical transmitter, wherein the post-amplifier assembly and laser driver assembly are integrated together in a single IC; and
      a digital control interface in communication with the digital IC controller and in at least indirect communication with the post-amplifier assembly and the laser driver assembly.

25. The optical transceiver as recited in claim 24, wherein the integrated post-amplifier and laser driver assembly is configured to receive signal parameter programming instructions from a user or an algorithm encoded within the optical transceiver.

26. The optical transceiver as recited in claim 24, wherein the at least one signal to which the at least one signal parameter corresponds is selected from the group consisting of: control signals; data signals; power signals; and, monitor signals.

27. The optical transceiver as recited in claim 24, wherein the at least one signal parameter is selected from the group consisting of: signal rise time; signal polarity; signal assert threshold; signal deassert threshold; signal fall time; signal amplitude; and, signal power.

28. The optical transceiver as recited in claim 24, further comprising:
   a glue logic module in communication with the digital control interface; and
   at least one digital to analog converter configured to receive signal parameter programming instructions, the at least one digital to analog converter being in communication with the glue logic module and at least one of: the post-amplifier assembly; and, the laser driver assembly.

29. The optical transceiver as recited in claim 28, wherein the at least one digital to analog converter is configured to receive the signal parameter programming instructions from a user or an algorithm internally encoded in the integrated post-amplifier and laser driver assembly.

30. The optical transceiver as recited in claim 24, further comprising an LOS circuit in at least indirect communication with the optical receiver and the digital IC controller.

31. The optical transceiver as recited in claim 24, wherein the post-amplifier assembly includes an amplifier having a data signal polarity control stage.

32. The optical transceiver as recited in claim 24, wherein the digital IC controller includes an I2C bus through which signal parameter programming instructions can be passed.

33. The optical transceiver as recited in claim 24, wherein the optical receiver comprises a 'receive' optical subassembly.

34. The optical transceiver as recited in claim 33, wherein the 'receive' optical subassembly comprises:
   a transimpedance amplifier; and
   a photodiode in communication with the transimpedance amplifier.

35. The optical transceiver as recited in claim 24, wherein the optical transmitter comprises a 'transmit' optical subassembly.

36. The optical transceiver as recited in claim 35, wherein the 'transmit' optical subassembly comprises:
   a laser; and
   a photodiode in communication with the laser.

37. The optical transceiver as recited in claim 36, wherein the laser comprises a VCSEL.

38. The optical transceiver as recited in claim 24, wherein the optical transceiver is compatible with a plurality of system protocols and line rates.

39. The optical transceiver as recited in claim 24, wherein the integrated post-amplifier and laser driver assembly is configured so that programming implemented with respect to the at least one signal parameter of at least one signal is based upon at least one of system line rate; and, system protocol.

40. The optical transceiver as recited in claim 24, wherein the at least one signal parameter includes signal rise time; signal polarity; signal assert threshold; signal deassert threshold; signal fall time; signal amplitude; and, signal power.

41. An integrated post-amplifier and laser driver assembly for use in connection with an optical receiver and an optical transmitter, comprising:
   a post-amplifier assembly configured for communication with the optical receiver;
   a laser driver assembly configured for communication with the optical transmitter;
   a digital control interface;
   an LOS circuit in at least indirect communication with the optical receiver and the digital control interface;
   a glue logic module in communication with the digital control interface; and
   a digital to analog converter configured to receive signal parameter programming instructions concerning the setting of LOS assert and deassert thresholds, the digital to analog converter being in communication with the glue logic module and at least one of: the post-amplifier assembly; and, the laser driver assembly.

42. The integrated post-amplifier and laser driver assembly as recited in claim 41, wherein the digital to analog converter is configured to receive signal parameter programming instructions from a user or an algorithm encoded within the integrated post-amplifier and laser driver assembly.

43. The integrated post-amplifier and laser driver assembly as recited in claim 41, wherein the LOS circuit is configured to receive first and second signals, the first signal corresponding to strength of an optical signal received at the integrated post-amplifier and laser driver, and the second signal being received from the digital to analog converter.

* * * * *